United States Patent
Morris et al.

(10) Patent No.: US 6,500,556 B1
(45) Date of Patent: Dec. 31, 2002

(54) ETHYLENE ACID COPOLYMER WITH ENHANCED ADHESION

(75) Inventors: Barry Alan Morris, Wilmington, DE (US); Yves Trouilhet, Vesenaz (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/620,935

(22) Filed: Jul. 21, 2000

Related U.S. Application Data

(60) Provisional application No. 60/145,298, filed on Jul. 23, 1999.

(51) Int. Cl.[7] .......................... B32B 15/08; B32B 27/30; C08L 33/02
(52) U.S. Cl. ................. 428/463; 156/244.11; 428/520; 428/522; 525/221
(58) Field of Search ................................. 428/463, 520, 428/522; 525/221; 156/244.11

(56) References Cited

U.S. PATENT DOCUMENTS

| | | | | |
|---|---|---|---|---|
| 4,376,845 A | * | 3/1983 | Metzger | 525/196 |
| 4,434,215 A | | 2/1984 | Wszolek et al. | 429/144 |
| 4,677,017 A | | 6/1987 | DeAntonis et al. | 428/214 |
| 4,769,406 A | | 9/1988 | Keithley | 524/100 |
| 5,028,265 A | | 7/1991 | Schmidt-Thuemmes et al. | 106/271 |
| 5,120,791 A | | 6/1992 | Sullivan | 525/196 |
| 5,217,812 A | | 6/1993 | Lee | 428/461 |
| 5,336,528 A | | 8/1994 | Bohme | 427/361 |
| 5,843,502 A | | 12/1998 | Ramesh | 426/127 |
| 5,880,241 A | | 3/1999 | Brookhart et al. | 526/348 |

FOREIGN PATENT DOCUMENTS

| | | |
|---|---|---|
| EP | 0 079 178 | 5/1983 |
| EP | 0 576 128 A1 | 12/1993 |
| EP | 0 592 920 | 4/1994 |
| JP | 62057442 | 3/1987 |
| JP | 06256595 | 9/1994 |
| JP | 08090711 | 4/1996 |
| WO | WO 97/19812 | 6/1997 |

OTHER PUBLICATIONS

PCT International Search Report for International application No. PCT/US00/20022, dated Nov. 16, 2000.

David L. Hester, at al., Using Acid Copolymers as Coextrusion Tie Layers, *TAPPI Proceedings*, 459–264, 1989 Polymers, Laminations and Coatings Conference.

* cited by examiner

*Primary Examiner*—D. S. Nakarani
(74) *Attorney, Agent, or Firm*—Craig H. Evans

(57) ABSTRACT

The present invention relates to an adhesive useful as a tie layer between a metal foil and polyethylene film that is a blend of two ethylene acrylic or methacrylic acid copolymers, one having a high-acid and a high-melt index and the other having a lower acid content and a lower melt index.

15 Claims, No Drawings

ETHYLENE ACID COPOLYMER WITH ENHANCED ADHESION

This appln claims benefit of Prov. No. 60/145,298 filed Jul. 23, 1999.

BACKGROUND OF THE INVENTION

1. Field of the Invention

The present invention relates to an adhesive, particularly an extrudable adhesive, for bonding a polar substrate particularly a metal foil such as aluminum foil to a non-polar substrate particularly a polymer film such as polyethylene film.

2. Description of Related Art

Plastic films, particularly polyethylene films, laminated to, coated on, or co-extruded with metal foil, particularly aluminum foil, have found utility in packaging and other applications such as cable shielding. The plastic film and the metal foil may be combined with other materials to form a structure having a plurality of layers, each layer having a specific purpose. Packaging laminates, for example, often comprise a plurality of layers. Such a packaging laminate might have a configurationally rigid core layer of paper or paperboard, an outer liquid-tight layer of polyethylene and an oxygen gas barrier mid-layer of aluminum foil and, optionally, other layers depending on application needs.

To form an effective laminate, it is important that good bonding strength or intimate integrity between the layers be achieved for most applications. For materials that do not normally adhere well to each other, an adhesive binder or tie layer is used to bond adjacent layers together.

Low density polyethylene (LDPE) has become the mainstay of the foil extrusion coating industry. It is low in cost, processes well, and has adequate normal adhesion to metal foils for many applications. For demanding applications, where durability of bond strength in the presence of aggressive products, good heat seal characteristics, and excellent food adhesion are desired, LDPE alone has limitations.

Ethylene $\alpha,\beta$ ethylenically-unsaturated carboxylic acid copolymers, particularly copolymers of ethylene and acrylic or methacrylic acid (E/AA and E/MAA), optionally partially neutralized, (available from the DuPont Company under the tradenames, "Nucrel", "Bynel", and "Surlyn") bond particularly well to metal foils. The acid groups on such an ethylene acid copolymer resin (ACR) provide bonding sites to the basic oxides on the foil surface. By increasing the acid level, adhesion to the foil is increased. The ethylene acid copolymers, however, are more costly than the LDPE and don't bond well with LDPE particularly with increasing acid levels.

There thus remains a need for an adhesive tie layer that will intimately bond to polyethylene, particularly LDPE, and to metal foil. There is a need to form a laminate that is less costly than a foil/ethylene acid copolymer laminate and that exhibits a superior durability of bond strength in the presence of aggressive products.

BRIEF SUMMARY OF THE INVENTION

The present invention relates to an adhesive, particularly an extrudable adhesive that has improved adhesion to both polar substrates such as metal foil and to non-polar substrates such as polyethylene. It particularly relates to an adhesive that produces a bond between metal foil and polyethylene that is durable in the presence of aggressive products such as ketchup, flavoring oils, juices and the like.

The adhesive of the present invention is an ethylene acid copolymer (ACR) blend consisting essentially of a high-acid, high-melt index (MI) acid copolymer blended with an acid copolymer that has both a lower acid level and a lower MI than the high-acid copolymer The present invention also relates to a laminate comprising a polar substrate such as a metal foil and a non-polar substrate such as polyethylene film bonded to each other with a tie layer of the adhesive of the present invention, and to the use of such a laminate in packaging and cable shielding applications.

DETAILED DESCRIPTION

As summarized above, the present invention relates to an adhesive, particularly an extrudable adhesive, to a laminate comprising a polar substrate, particularly a metal foil such as aluminum foil, and non-polar substrate, particularly a polyethylene film bonded by a tie-layer of the adhesive, and to uses of the laminate.

The laminates of the present invention have a plurality of layers, at least one of which being a non-polar substrate being bonded to at least one layer that is a polar substrate by a tie layer of adhesive film.

The thickness of the laminates of the present invention depends on the application and the substrates used. Typical packaging laminates preferably have a thickness of about 0.1 mil (2.5 micrometers) to about 10 mil (250 micrometers), more preferably of about 0.5 mil (12.5 micrometers) to about 2 mil (50 micrometers). Cable shield laminates would be substantially thicker. A paper substrate typically will be relatively thick (about 1 to about 10 mil (25 to 250 micrometers), films will be relatively thin (about 0.2 to about 2 mil (5 to 50 micrometers), and foils will typically be thinner still (about 0.2 to 2 mil (5 to 50 micrometers).

The non-polar substrate preferably is a polyethylene film. The polyethylene film can be selected from low density polyethylene (LDPE), linear low density polyethylene (LLDPE), or high density polyethylene (HDPE). It may be made by any available process known for making such polyethylene including high pressure gas, low pressure gas, solution and slurry processes employing conventional Ziegler-Natta, metallocene, and late transition metal complex catalyst systems.

The preferred polar substrate is a metal foil, more preferably aluminum foil. Other substrates include metalized substrates such as metalized polypropylene, paper, polyester, nylon, and ethylene vinyl alcohol. The polar substrate may be surface treated by means known in the art such as corona treatment to improve the adhesion, but such treatment is not required in the present invention and preferably is not used in the case of foils and metalized substrates.

Film substrates may be primed with various primers known in the art, particularly PEI and polyurethane primers, before applying the adhesive tie layer of the present invention.

The adhesive employed in the tie layer is a blend of ethylene-$\alpha,\beta$ ethylenically-unsaturated $C_3$–$C_8$ carboxylic acid copolymers (ACR's). It particularly is a blend comprising about 5 to about 95, preferably about 15 to about 85, and more preferably about 15 to about 40, parts by weight High-Acid, High-MI ACR and about 5 to about 95, preferably about 15 to about 85, and more preferably about 60 to about 85, parts by weight Low-Acid, Low-MI ACR. Preferably, the Low-Acid, Low-MI ACR is the major component and the High-Acid, High-MI ACR is the minor component. More than two ACR's may be included so long as at least one is a High-Acid, High-MI ACR and one is a Low-Acid, Low-MI ACR and the other copolymers do not compatibilize the High-Acid, High-MI and Low-Acid, Low-MI ACR's in a way that prevents the High-Acid, High-MI ACR from moving to the surface away from a non-polar substrate when the adhesive is co-extruded with the non-polar substrate.

Both the High-Acid, High-MI ACR and the Low-Acid, Low-MI ACR (as well as other ACR's that may be in the blend) are ethylene-α,β ethylenically-unsaturated $C_3$–$C_8$ carboxylic acid copolymers, optionally having at least one softening co-monomer that is co-polymerizable with ethylene. Acrylic and methacrylic acids are preferred acid co-monomers. The softening co-monomer can be an alkyl acrylate selected from the group consisting of n-propyl-, n-butyl-, i-butyl-, n-octyl-, 2-ethylhexyl-. and 2-methoxyethyl-acrylates. The preferred alkyl acrylates are n-butyl-, i-butyl-, 2-ethylhexyl-, and 2-methoxyethyl-acrylates. The softening co-monomer can also be an alkyl vinyl ether selected from the group consisting of n-butyl, n-hexyl, 2-ethylhexyl-, and 2-methoxyethyl-vinyl ether. The preferred alkyl vinyl ethers are n-butyl vinyl ether and n-hexyl vinyl ether.

Preferably the High-Acid, High-MI ACR and the Low-Acid, Low-MI ACR are not neutralized. Either or both may be partially neutralized, however, so long as the resulting un-neutralized acid levels and the melt indices of the resulting partially neutralized ACR's meet the limitations set forth for the non-neutralized ACR's. Preferably, low levels of neutralization can be employed through the addition of sources of cations such as zinc, sodium, magnesium and the like. Preferred low levels are less than 500 parts per million (more preferably between about 100 and 200 or 300 ppm) based on the total weight of the High-Acid, High-MI ACR and the Low-Acid, Low-MI ACR in the blend.

Useful High-Acid, High-MI ACR and Low-Acid, Low-MI ACR copolymers are available from DuPont under the Trademarks NUCREL® and BYNEL®. The High-Acid, High-MI ACR and the Low-Acid, Low-MI ACR are more fully described as follows:

High-Acid, High-MI ACR

High-Acid, High-MI ACR preferably is an ethylene acrylic acid or an ethylene methacrylic acid copolymer. The acid content and the MI need not be "high" in an absolute sense; they must only be high in the sense of being higher than the acid content of the Low-Acid, Low-MI ACR and at least as high or higher than the MI of the Low-Acid, Low-MI ACR.

Preferably the acid percentage of the High-Acid, High-MI ACR is 3 weight percentage points or more higher than that of the Low-Acid, Low-MI ACR (that is, for example, for a Low-Acid, Low-MI ACR acid level of 9 weight percent (wt. %), the High-Acid, High-MI ACR acid level would be 12 wt. % or higher). Preferably the difference is 3 to 15, more preferably 3 to 6 weight percentage points. Preferably the weight percent acid in the High-Acid, High-MI ACR is about 7 to about 25, more preferably about 10 to about 20 wt. %.

The MI (measured in accord with ASTM D-1238, condition E, at 190° C., using a 2160 gram weight) of this High-Acid, High-MI ACR must be at least as high as or higher than the MI of the Low-Acid, Low-MI ACR. The preferred MI of the High-Acid, High-MI ACR is about 7 to about 1000, more preferably about 10 to about 100 or about 10 to about 60 grams/10 minutes.

Low-Acid Low-MI ACR

Low-Acid, Low-MI ACR preferably is an ethylene acrylic acid or an ethylene methacrylic acid copolymer. The acid content need not be "low" in an absolute sense; it must only be lower than the acid content of the High-Acid, High-MI ACR.

Preferably the weight percent acid in the Low-Acid, Low-MI ACR is about 1 to about 22, more preferably about 4 to about 15 or-about 7 to about 12 wt. %.

The M of the Low-Acid, Low-MI ACR must be at least as low as and preferably lower than the MI of the High-Acid, High-MI ACR. Preferably the MI is about 0.1 to about 20, more preferably about 2 to about 14 or about 2 to about 9 grams/10 minutes.

Blend

The High-Acid, High-MI ACR and the Low-Acid, Low-MI ACR are selected to yield a resultant MI of the blend in a range that can be processed in co-extruding equipment, particularly with LDPE. The resultant MI preferably should be in the range of about 4 to about 20, more preferably about 6 to about 14 grams/10 minutes. The resultant acid level preferably is more than 1 wt. %, preferably about 7 wt. % or more, preferably about 7 to about 12 wt. %. These percentages are preferably methacrylic acid equivalents.

Process For Making Adhesive Tie Layer

The blend of High-Acid, High-MI ACR and Low-Acid, Low-MI ACR according to the invention can be made by melt blending the polymers under medium to high shear conditions, for example in a single-screw or a twin-screw extruder. The High-Acid, High-MI ACR and Low-Acid, Low-MI ACR may first be combined with one another (e.g., in a pellet blend), or they may be combined with one another via simultaneous or separate metering of the various components to the extruder.

Process For Making Laminate

The process for making the laminate preferably is a co-extrusion coating process well known in the art such as the one described below.

EXAMPLE

Procedure Used in Examples to Prepare Laminates

The laminates were prepared using a co-extrusion coating process. LDPE and (except as indicated) a pellet blend of ACR were fed into separate extruders, melted, combined in a feedblock and pushed out a die. The molten ACR side of the molten extrudate was contacted with the foil, quenched on a chill roll, and wound. In some cases foil was corona treated (3.57 Watts/ft$^2$) to improve the adhesion of the ACR to foil to allow easier separation between the ACR and LDPE for adhesion measurements. In all cases, the adhesion to foil measurements and acid durability tests were conducted on structures that had not been treated.

For the examples, LDPE was extruded using a 4.5 inch diameter, 126 inch long, single screw extruder with an exit temperature of 570° F. operated at about 45 revolutions per minute. The ACR was melt blended in a 2.5 inch diameter, 70 inch long, 2 stage, single screw extruder with a temperature profile of 350, 450, 550, 570, 570° F. operated at about 90 revolutions per minute. The extrudates from the two extruders were combined through an ER-WE-PA feedblock with a 40 inch wide (internally deckled to 28 inches) Cloeren edge bead reduction die having a 30 mil gap operated at 570° F. and a back pressure of 260 psig to form a 0.2 mil thick ACR layer co-extruded with a 1 mil thick LDPE layer. This co-extrudate was then coated onto a 2 mil thick foil with the ACR side of the extrudate contacting the foil. The air gap between the die exit and the nip (where the extrudate contacted the foil) formed by a chill roll and a nip roll was 7 inches. The chill roll was operated at 60° F. The foil line speed was 700 feet/minute.

Tests Employed in Examples

Melt Index (MI)

Melt Index (MI) was measured in accord with ASTM D-1238, condition E, at 190° C., using a 2160 gram weight, with values of MI reported in grams/10 minutes. Melt index is a measure of the ability of the molten polymer to flow. MI is inversely related to viscosity and generally, for a given type of polymer, the higher the MI, the lower the molecular weight.

Acid Weight Percent

Weight percent (wt. %) acid in ACR's was measured by Fourier Transform Infrared Spectrophotometry (FTIR Analysis) using standards calibrated by titration.

Peel Strength

One-inch wide strips were cut in the machine direction from near the center of the substrate. The layers were separated at the designated interface (either between the LDPE and acid copolymer or between the acid copolymer and the foil) and pulled in a tensile tester at room temperature in a "T-peel" configuration at a separation speed of 12 inches/minute. The average force required to separate the sample divided by the width is reported as the peel strength (values in the tables were rounded to the nearest 10, with values. ending in 5 being rounded up, "CNS" means "could not start," and "N/R" means "not run."). Typically, five separate determinations were averaged together for a given value. See ASTM F904. Green peel strength was measured within four hours of producing the structure. Peel strength on the same sample was typically also measured again after being stored in a 50% relative humidity, 23° C. controlled environment for one-week.

Acid Durability Test

Several 8-inch by 4.5-inch strips were cut from near the center of the web (the 8-inch dimension in the machine direction). Each strip was folded over (LDPE side facing inward) and heat-sealed along the sides to form a pouch with dimensions of 4-inches by 4.5-inches.

The pouches were filled with 40 to 45 cubic centimeters (cc) of a 3% acetic acid solution and heat sealed closed. Heat seal conditions were typically 290° F., 1.5 second dwell, and 30 pounds per square inch gauge (psig).

The filled pouches were placed in an oven at 40° C. Periodically, a pouch was removed and cut open. The acid was removed and the inner surface rinsed with water. The pouches were spread open to the original 8-inch by 4-inch dimensions and three 1-inch wide strips were cut along the 8-inch length, each strip having a bottom and top half separated by a crease. The bottom half was stored in the oven such that the liquid was always in contact with it. The polymer coating was separated from the foil (typically at the foil/acid copolymer interface) starting from the bottom of the strip. The peel arms were placed into the jaws of a tensile tester at room temperature (about 23° C.) and pulled at a speed of 10 inches/minute in a T-peel configuration. The maximum and average force divided by the sample width is recorded as the peel strength. An average of three determinations is recorded.

Based on the recorded data, acid durability in terms of "days to failure", that is, days elapsed between when pouches were filled and when they started to swell or when the peel strength fell below a threshold value (typically 200 grams/inch), are reported.

Resins Employed in the Examples

The acid copolymer resins used in the Examples are defined in the following table.

| Resin | Acid Type | % Acid | MI |
|---|---|---|---|
| A | MAA | 12 | 7 |
| B | MAA | 15 | 25 |
| C | MAA | 9 | 3 |
| D | MAA | 9 | 10 |
| E | MAA | 6 | 9 |
| F | MAA | 12 | 14 |
| G | MAA | 12 | 2 |
| H | MAA | 4 | 7 |
| I | MAA | 15 | 60 |
| J | AA | 7 | 7 |
| K | AA | 18 | 60 |
| L | AA | 9.5 | 10 |
| M | MAA | 4 | 3 |

Examples C1, 2 and 3

As can be seen in the following table, blends of high-acid, high-MI ACR with low-acid, low-MI ACR outperform single ACR of the same acid level in peel tests. The data exemplifies 3 ACR's in the blend of the invention.

| | | | | | | | Total | Peel Strength LDPE, g/in | | Al, g/in | |
|---|---|---|---|---|---|---|---|---|---|---|---|
| Ex. | $R_1$ | $R_2$ | $R_3$ | % $R_1$ | % $R_2$ | % $R_3$ | Acid | Green | 1 wk. | Green | 1 wk |
| C1 | A | | | 100 | | | 12 | 460 | 480 | 510 | 720 |
| 2 | B | C | | 50 | 50 | | 12 | 580 | 590 | 540 | 780 |
| 3 | A | B | C | 50 | 25 | 25 | 12 | 570 | 570 | 570 | 780 |

Examples C4, 5 and C6

As can be seen in the following table, a blend in which the high-acid ACR has an MI higher than the MI of the low-acid ACR outperforms blends in which the high-acid ACR has an MI lower than the MI of the low-acid ACR of the same acid level in peel tests.

| | | | | | | Total | Peel Strength LDPE, g/in | | Al, g/in | |
|---|---|---|---|---|---|---|---|---|---|---|
| Ex. | $R_1$ | $R_2$ | % $R_1$ | % $R_2$ | | Acid | Green | 1 wk. | Green | 1 wk |
| C4 | D | | 100 | | | 8.7 | N/R | N/R | 500 | 670 |
| 5 | E | F | 55 | 45 | | 8.7 | N/R | N/R | 600 | 790 |
| C6 | E | G | 55 | 45 | | 8.7 | N/R | N/R | 340 | 440 |

Examples C7, 8 and C9

As can be seen below, blends with a lower total acid level than a single ACR can have better adhesion performance than the higher acid single ACR in peel tests.

|       |       |       |       | Total |  Peel Strength       |       |       |       |
|       |       |       |       |       | LDPE, g/in   |       | Al, g/in |       |
| Ex.   | $R_1$ | $R_2$ | % $R_1$ | % $R_2$ | Acid | Green | 1 wk. | Green | 1 wk |
| C7    | D     |       | 100   |       | 8.7   | 490   | 590   | 770   | 860   |
| 8     | H     | I     | 85    | 15    | 5.7   | 900   | 740   | 890   | 780   |
| C9    | H     |       | 100   |       | 4     | CNS   | CNS   | 450   | 320   |

Examples C10, 11, C12 and 13

The following examples employing ethylene acrylic acid co-polymer resins show blends of high-acid, high-MI ACR with low-acid, low-MI ACR outperform a single ACR of higher acid level in peel tests.

|       |       |       |       | Total Acid (MAA eq.) | Peel Strength |       |       |       |
|       |       |       | %     | %     |       | LDPE, g/in |   | Al, g/in |       |
| Ex.   | $R_1$ | $R_2$ | $R_1$ | $R_2$ | %     | Green | 1 wk. | Green | 1 wk |
| C-10  | J     |       | 100   |       | 8.4   | CNS   | 630*  | 820   | 780   |
| 11    | J     | K     | 85    | 15    | 10.4  | CNS   | CNS   | 970   | 940   |
| C-12  | L     |       | 100   |       | 11.4  | CNS   | CNS   | 860   | 890   |
| 13    | L     | M     | 85    | 15    | 10.3  | 470   | 550   | 990   | 880   |

*one sample, other 4 could not start

Example 14, 15, 16, 17, 18 and 19

As can be seen below, melt and pellet blends give similar results in peel tests.

|       |       |       |       |       |        | Peel Strength |       |       |       |
|       |       |       |       |       |        | LDPE, g/in |   | Al, g/in |       |
| Ex.   | $R_1$ | $R_2$ | % $R_1$ | % $R_2$ | Type Blend | Green | 1 wk. | Green | 1 wk |
| 14    | H     | I     | 85    | 15    | Pellet | 900   | 740   | 890   | 780   |
| 15    | H     | I     | 85    | 15    | Melt   | CNS   | CNS   | 970   | 1080  |
| 16    | H     | B     | 85    | 15    | Pellet | CNS   | CNS   | 900   | 1010  |
| 17    | H     | B     | 85    | 15    | Melt   | CNS   | CNS   | 870   | 1030  |
| 18    | H     | B     | 90    | 10    | Pellet | 818   | 584   | 640   | 660   |
| 19    | H     | B     | 90    | 10    | Melt   | CNS   | CNS   | 730   | 760   |

Example C20, 21, C22, and 23

As can be seen in the following table, Example 21 has lower overall acid than Example C22 yet has high peel strength to foil, better adhesion to LDPE, and holds up as well in an aggressive acidic environment. Example 23, with an acid level comparable to that of Example C20 and lower than C22, has a higher peel strength to foil, better bond durability, and, with respect to Example C22, a better adhesion to LDPE.

While not intending to limit the invention, it is believed that the improved bond durability may be due to the High-Acid, High-MI ACR making its way to the foil/ACR interface. It is noted however that the bond durability is lower than would be expected for a pure 15% acid grade (greater than 20 days). This could be caused by the resistance of the polymer to acid diffusion at the ACR/foil interface, higher acid copolymers exhibiting greater resistance to acid migration. This suggests that bond durability may be a function of the acid at the foil/ACR interface (number of chemical bonds that form between the acid groups on the polymer and oxides on the foil surface) and the resistance of the polymer to acid diffusion to the interface.

|       |       |       |       |       | Total Acid | 1 wk. Peel Strength |       | Days to Failure |
|       |       |       | %     | %     | (MAA eq.) | LDPE, | Al,   | 3% AcA, |
| Ex.   | $R_1$ | $R_2$ | $R_1$ | $R_2$ | %     | g/in  | g/in  | 40° C. |
| C20   | E     | —     | 100   | 0     | 6     | CNS   | 760   | 3     |
| 21    | E     | I     | 85    | 15    | 7.4   | CNS   | 900   | 7     |
| C22   | D     | —     | 100   | 0     | 9     | 580   | 820   | 7     |
| 23    | H     | B     | 85    | 15    | 5.7   | CNS   | 1010  | 9     |

Examples C24, 25, C26 and 27

Days to failure is reported as a range in these examples to reflect the differing results on repeated tests. Example 25 has a lower total acid yet a better peel strength to aluminum foil, as well as better bond durability in the presence of acetic acid than Example C26. Example 27, exemplifying a Low-Acid, Low-MI ACR as a minor component in a blend, has better peel strength to LDPE and about the same performance in bond durability when compared to Example C26.

|       |       |       |       |       | Total Acid | 1 wk. Peel Strength |       | Days to Failure |
|       |       |       | %     | %     | (MAA eq.) | LDPE, | Al,   | 3% AcA, |
| Ex.   | $R_1$ | $R_2$ | $R_1$ | $R_2$ | %     | g/in  | g/in  | 40° C. |
| C24   | J     | —     | 100   | 0     | 8.4   | 630   | 780   | 7–11  |
| 25    | J     | K     | 85    | 15    | 10.4  | CNS   | 940   | 18–21 |
| C26   | L     | —     | 100   | 0     | 11.4  | CNS   | 890   | 12–18 |
| 27    | L     | M     | 85    | 15    | 10.3  | 550   | 880   | 15    |

What is claimed is:

1. An adhesive for adhering a non-polar substrate co-extruded with it to a polar substrate consisting essentially of a blend of more than one ethylene-α,β ethylenically-unsaturated $C_3$–$C_8$ carboxylic acid copolymer (ACR) containing about 5 to about 95 parts by weight High-Acid, High-MI ACR and about 5 to about 95 parts by weight Low-Acid, Low-MI ACR wherein the High-Acid, High MI ACR is an ethylene-α,β ethylenically-unsaturated $C_3$–$C_8$ carboxylic acid copolymer having an acid level that is at least 3 percentage points higher than the acid level of the Low-Acid, Low MI ACR and an MI, measured in accord with ASTM D-1238, condition E, at 190° C., using a 2160 grams weight, that is at least as high as the MI of the Low-Acid, Low-MI ACR, and the Low-Acid, Low-MI ACR is an ethylene-α,β ethylenically-unsaturated $C_3$–$C_8$ carboxylic acid copolymer having an acid level of about 1 to about 22 wt. % and an MI, measured in accord with ASTM D-1238, condition E, at 190° C., using a 2160 grams weight, of about 0.1 to about 20 grams/10 minutes, provided that the MI of the resultant blend is about 4 to about 20 grams/10 minutes.

2. The adhesive of claim 1 wherein the acid level of the High-Acid, High-MI ACR is about 3 to about 15 percentage points higher than the acid level of the Low-Acid, Low-MI ACR.

3. The adhesive of claim 1 wherein the acid level of the High-Acid, High-MI ACR is about 3 to about 6 percentage points higher than the acid level of the Low-Acid, Low-MI ACR.

4. The adhesive of claim 1, 2 or 3 wherein the MI of the High-Acid, High-MI ACR is about 7 to about 1000 grams/10 minutes.

5. The adhesive of claim 4 wherein the MI of the High-Acid, High-MI ACR is about 10 to about 100 grams/10 minutes.

6. The adhesive of claim 5 wherein the MI of the High-Acid, High-MI ACR is about 10 to about 60 grams/10 minutes.

7. The adhesive of claim 1, 2 or 3 wherein the blend has about 15 to about 85 parts by weight High-Acid, High-MI ACR and about 15 to about 85 parts by weight Low-Acid, Low-MI ACR.

8. The adhesive of claim 7 wherein the blend has about 15 to about 40 parts by weight High-Acid, High-MI ACR and about 60 to about 85 parts by weight Low-Acid, Low-MI ACR.

9. The adhesive of claim 1, 2 or 3 wherein the Low-Acid, Low-MI ACR is the major component of the blend.

10. The adhesive of claim 1, 2 or 3 wherein the acid level of the blend is about 7–12 wt. %.

11. A laminate comprising multiple layers at least one of which is a polar substrate and at least one of which is a non-polar substrate, the polar substrate being adhered to the non-polar substrate by a layer of the adhesive of claim 1, 2 or 3.

12. The laminate of claim 11 wherein the non-polar substrate is a polyethylene film and the polar substrate is a metal foil.

13. The laminate of claim 12 wherein the metal foil is an aluminum foil.

14. A process for making a laminate comprising a polar substrate and a non-polar substrate comprising co-extruding the adhesive of claim 1, 2, or 3 with the non-polar substrate and coating the resulting extrudate onto the polar substrate in a manner that causes the adhesive layer to contact the polar substrate.

15. The process of claim 14 wherein the non-polar substrate is polyethylene and the polar substrate is metal foil.

* * * * *